(12) United States Patent
Ishizaki et al.

(10) Patent No.: US 9,832,324 B2
(45) Date of Patent: Nov. 28, 2017

(54) MARK DETECTING DEVICE, BELT CONTROL DEVICE, IMAGE FORMING APPARATUS, MARK DETECTING METHOD, AND COMPUTER-READABLE RECORDING MEDIUM

(71) Applicants: Yusuke Ishizaki, Kanagawa (JP); Takehiro Chiba, Kanagawa (JP)

(72) Inventors: Yusuke Ishizaki, Kanagawa (JP); Takehiro Chiba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/299,111

(22) Filed: Oct. 20, 2016

(65) Prior Publication Data

US 2017/0126905 A1 May 4, 2017

(30) Foreign Application Priority Data

Oct. 28, 2015 (JP) .................................. 2015212184

(51) Int. Cl.
  *G06F 3/12* (2006.01)
  *H04N 1/00* (2006.01)
  *H04N 1/60* (2006.01)

(52) U.S. Cl.
  CPC ..... *H04N 1/00082* (2013.01); *H04N 1/00015* (2013.01); *H04N 1/00037* (2013.01); *H04N 1/00058* (2013.01); *H04N 1/0061* (2013.01); *H04N 2201/0094* (2013.01)

(58) Field of Classification Search
  None
  See application file for complete search history.

(56) References Cited

U.S. PATENT DOCUMENTS

| 2008/0292369 | A1* | 11/2008 | Takezawa | .......... | G03G 15/0131 399/301 |
| 2012/0237233 | A1* | 9/2012 | Kato | .................. | G03G 15/0131 399/49 |
| 2015/0227103 | A1* | 8/2015 | Ogata | .................... | G01S 17/026 399/405 |

FOREIGN PATENT DOCUMENTS

JP 4676746 2/2011

\* cited by examiner

*Primary Examiner* — Dov Popovici
(74) *Attorney, Agent, or Firm* — Duft Bornsen & Fettig LLP

(57) ABSTRACT

A mark detecting device includes: a belt on which a plurality of marks are provided along a moving direction of the belt; a light-emitting element configured to irradiate at least one of the marks with light; a light-receiving element configured to receive a reflected light reflected from at least one of the belt and the mark of the light irradiated from the light-emitting element and output a signal; and a light amount adjuster configured to compare a first value obtained from the signal output by the light-receiving element and a second value obtained from a signal output by the light-receiving element after the first value is obtained, and to perform light amount adjustment of the light-emitting element when a difference between the first value and the second value is a first threshold or more.

8 Claims, 10 Drawing Sheets

MARK DETECTING DEVICE, BELT CONTROL DEVICE, IMAGE FORMING APPARATUS, MARK DETECTING METHOD, AND COMPUTER-READABLE RECORDING MEDIUM

CROSS-REFERENCE TO RELATED APPLICATIONS

The present application claims priority under 35 U.S.C. §119 to Japanese Patent Application No. 2015-212184 filed Oct. 28, 2015. The contents of which are incorporated herein by reference in their entirety.

BACKGROUND OF THE INVENTION

1. Field of the Invention

The present invention relates to a mark detecting device, a belt control device, an image forming apparatus, a mark detecting method, and a computer-readable recording medium.

2. Description of the Related Art

Conventionally, a technology is known in which a mark is provided along a moving direction of an endless belt, a moving speed of a belt surface is calculated from a signal obtained by detecting the mark using a sensor, and the calculated speed is fed back to a drive control of the belt.

Japanese Patent No. 4676746 discloses an optical sensor for detecting the mark in which a decrease of output due to temperature change near the optical sensor or due to time degradation of the optical sensor is suppressed and setting of a light amount of the optical sensor is changed so as to be increased for the purpose of stabilizing the output when the output of the optical sensor falls below a threshold.

However, the method described in Japanese Patent No. 4676746 has a problem that because the setting of the light amount of the optical sensor is changed when the output of the optical sensor is less than the threshold, light amount adjustment may occur again and again.

In view of the conventional problems, there is a need to provide a mark detecting device, a belt control device, an image forming apparatus, a mark detecting method, and a computer-readable recording medium having a program capable of preventing repeated occurrence of the light amount adjustment.

SUMMARY OF THE INVENTION

According to exemplary embodiments of the present invention, there is provided a mark detecting device comprising: a light-emitting element configured to irradiate a mark provided in plurality on a belt along a moving direction of the belt with light; a light-receiving element configured to receive a reflected light reflected from at least one of the belt and the mark of the light irradiated from the light-emitting element and output a signal; and a light amount adjuster configured to compare a first value obtained from the signal output by the light-receiving element and a second value obtained from a signal output by the light-receiving element after the first value is obtained, and to perform light amount adjustment of the light-emitting element when a difference between the first value and the second value is a first threshold or more.

Exemplary embodiments of the present invention also provide a belt control device comprising: the above-described mark detecting device; a drive unit configured to transmit a drive force to move the belt; and a control unit configured to control a speed at which the belt is moved or a position thereof by controlling the drive unit using a control signal based on the signal output from the light-receiving element of the mark detecting device.

Exemplary embodiments of the present invention also provide an image forming apparatus comprising the above-described belt control device.

Exemplary embodiments of the present invention also provide a mark detecting method of a mark detecting device including a light-emitting element configured to irradiate a mark provided in plurality on a belt along a moving direction of the belt with light and a light-receiving element configured to receive a reflected light reflected from at least one of the belt and the mark of the light irradiated from the light-emitting element and output a signal, the mark detecting method comprising: comparing a first value obtained from the signal output by the light-receiving element and a second value obtained from a signal output by the light-receiving element after the first value is obtained; performing light amount adjustment of the light-emitting element when a difference between the first value and the second value is a first threshold or more; and storing a value, as the first value, obtained from a signal output by the light-receiving element that receives the reflected light after the light amount adjustment of the light-emitting element is performed at the performing the light amount adjustment, in a storage unit.

Exemplary embodiments of the present invention also provide a non-transitory computer-readable recording medium that contains a computer program for causing a mark detecting device including a light-emitting element configured to irradiate a mark provided in plurality on a belt along a moving direction of the belt with light and a light-receiving element configured to receive a reflected light reflected from at least one of the belt and the mark of the light irradiated from the light-emitting element and output a signal, to execute: comparing a first value obtained from the signal output by the light-receiving element and a second value obtained from a signal output by the light-receiving element after the first value is obtained; performing light amount adjustment of the light-emitting element when a difference between the first value and the second value is a first threshold or more; and storing a value, as the first value, obtained from a signal output by the light-receiving element that receives the reflected light after the light amount adjustment of the light-emitting element is performed at the performing the light amount adjustment, in a storage unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
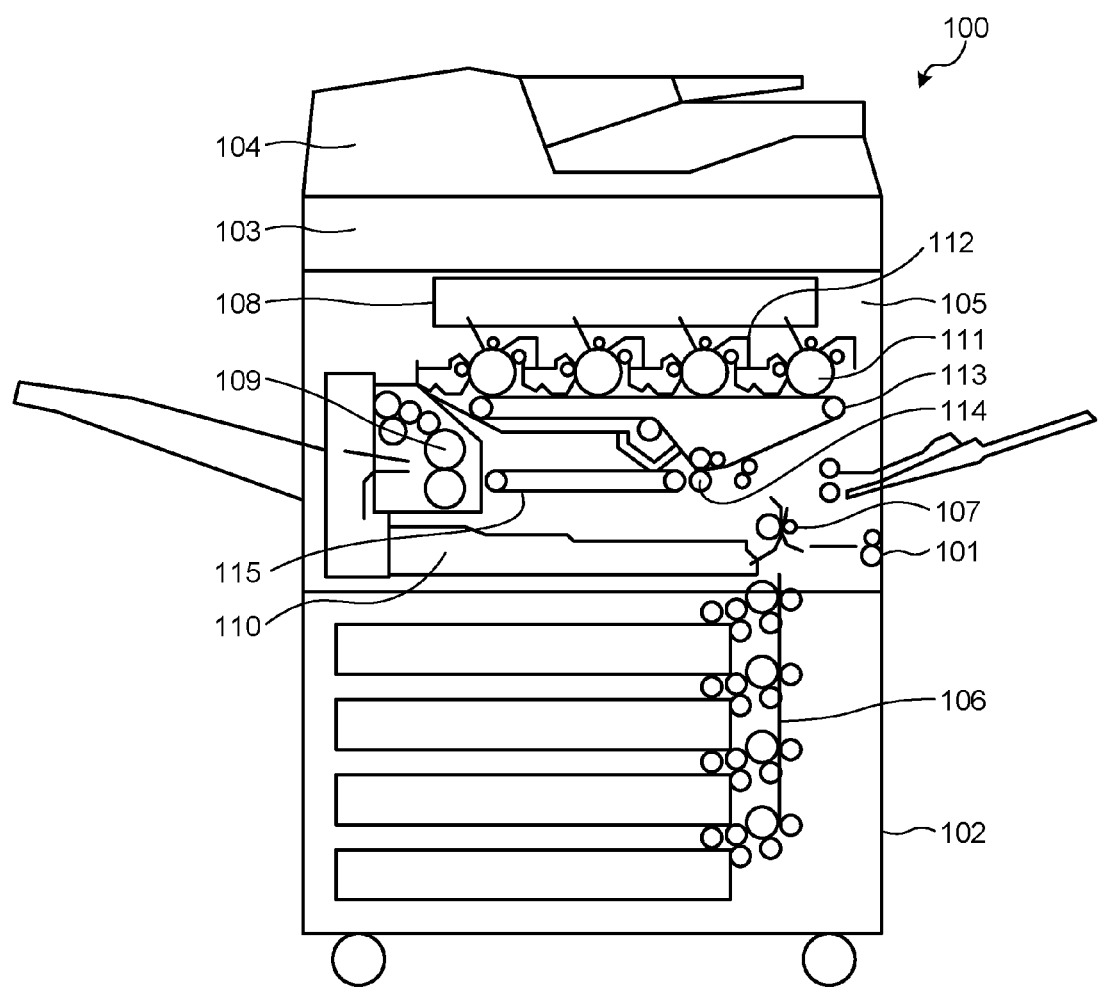
FIG. 1 is a diagram illustrating a configuration example of an image forming apparatus according to a first embodiment of the present invention.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of a mark detecting device, a belt control device, an image forming apparatus, a mark detecting method, and a computer-readable recording medium having a computer program will be explained in detail below with reference to the accompanying drawings. It should be noted that the present invention is not limited by the embodiments. In addition, the embodiments can be appropriately combined with each other in a range in which contents are not contradicted. In the following, a case in which one embodiment of the image forming apparatus that includes the mark detecting device and the belt control device according to the present invention is applied to a multifunction peripheral (MFP) will be explained as an example, however, the case is not limited thereto. The MFP is a device that includes at least two functions among a print function (printer function), a copying function (copy function), a scanner function, and a facsimile function.

First Embodiment

A configuration example of an image forming apparatus 100 will be explained first with reference to FIG. 1. FIG. 1 is a diagram illustrating a configuration example of an image forming apparatus according to the present embodiment. As illustrated in FIG. 1, the image forming apparatus 100 is a digital multifunction peripheral that includes a paper feeding section 102 and an image forming apparatus body (image forming section) 101 and is provided with an image reading device 103 and an automatic document feeder (ADF) 104 on its upper portion. The image reading device 103 may be configured so that the ADF 104 is integrated therewith to form a single image reading device.

The image forming apparatus body 101 has an image forming unit 105 of tandem system, a registration roller 107 that conveys recording paper (recording medium) fed from the paper feeding section 102 via a conveying path 106 to the image forming unit 105, an optical writing device 108, a fixing unit 109, a double-sided tray 110, and a conveying unit 115, which are provided inside the image forming apparatus body 101.

Four photoconductor drums 111 are arranged in parallel with each other, corresponding to toners of four colors of Y (yellow), M (magenta), C (cyan), and K (black) respectively, in the image forming unit 105. Arranged around each of the photoconductor drums 111 are image forming elements including a charger, a developing device 112, a transfer device, a cleaner, and a static eliminator.

An intermediate transfer belt 113 stretched between a drive roller 15 and a driven roller 16 (see FIG. 2) is provided between the transfer device and each of the photoconductor drums 111 in a state of being sandwiched at each nip between the two.

The image forming apparatus 100 of the tandem system configured in this manner performs optical writing to the photoconductor drum 111 corresponding to each of the colors of Y, M, C, and K, for each color, develops an image for each color toner using the developing device 112, and performs primary transfer of developed images onto the intermediate transfer belt 113 in the order of, for example, Y, M, C, and K.

The image forming apparatus 100 forms a full-color image on the recording paper by performing secondary transfer of the full-color image, in which the four colors are superimposed by the primary transfer, to the recording paper, then fixing the full-color image on the recording paper, and ejecting the recording paper.

The image forming apparatus 100 forms an image read by the image reading device 103 on the recording paper. The image forming apparatus 100 is configured so that, for example, the image reading device 103 scans a document while irradiating the document with light from a light source and a 3-line CCD sensor receives the reflected light from the document to read the image. The read image data is subjected to image processing such as scanner y-correction, color conversion, image separation, and gradation correction processing by an image processing unit, and the processed image data is then sent to the optical writing device 108. The optical writing device 108 modulates the drive of a laser diode (LD) according to the image data. In a photoconductor unit, a latent image is written to the uniformly charged and rotating photoconductor drum 111 with a laser beam emitted from the LD, and in a developing unit, the toner is made to adhere to the latent image by the developing device 112 to be visualized. The image formed on the photoconductor drum 111 is again transferred to the intermediate transfer belt (primary transfer belt) 113 as a primary transfer unit. In a case of full color copying, the four-color toners are sequentially superimposed on the intermediate transfer belt 113 (four colors of Y, M, C, and K). In the case of full color copying, the recording paper (recording medium) is fed by the paper feeding section 102 by matching the timing with that of the intermediate transfer belt 113 at the time of finishing the image forming processes and transfer processes of the four colors of Y, M, C, and K, and the toners of the four colors are simultaneously transferred from the intermediate transfer belt 113 to the recording paper (recording medium) between a secondary transfer roller 17 (see FIG. 2) as a secondary transfer unit and a secondary transfer counter roller 114 located outside thereof. The recording paper (recording medium) to which the toners are transferred is sent to the fixing unit 109, via the conveying unit 115, in which the toners are thermally fixed thereon by a fixing roller and a pressure roller, and is ejected.

Figure 2:
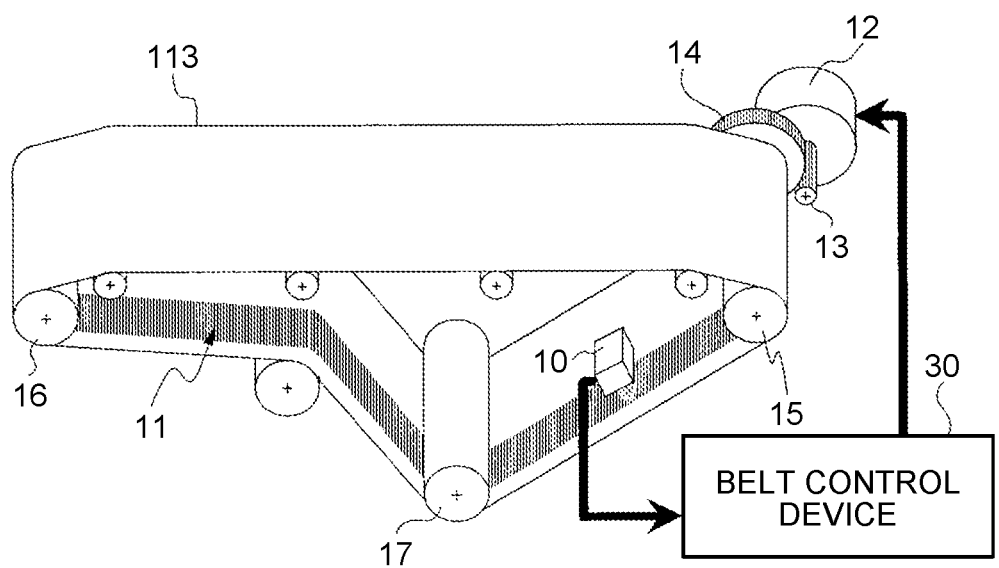
FIG. 2 is a diagram illustrating a configuration example of a belt control device that constitutes an intermediate transfer belt and its surrounding drive system and control system.

FIG. 2 is a diagram illustrating a configuration example of a belt control device that constitutes an intermediate transfer belt and its surrounding drive system and control system. As illustrated in FIG. 2, a belt control device 30 includes a belt scale 11 that forms a plurality of marks (reflective portions) on an inner peripheral surface (back) of the intermediate transfer belt 113, which is an endless belt member (endless moving member), so as to be continuous at equal intervals (predetermined intervals) along its rotational direction (endless moving direction). In other words, the marks (reflective portions) are provided on the belt along the moving direction of the belt.

The intermediate transfer belt 113 is driven by a drive motor 12. A speed reduction mechanism including gears 13 and 14 is provided between the drive motor 12 and the drive roller 15, and force is transmitted to the drive roller 15 at a speed such that a motor shaft speed is decelerated by the amount of a gear ratio.

The drive of the intermediate transfer belt 113 is controlled so that the speed of the surface of the intermediate transfer belt 113 becomes a target speed and a constant speed by inputting a signal to the belt control device 30, the signal indicating a speed of the surface of the intermediate transfer belt 113 obtained by detecting an encoder provided on the shaft of the drive roller 15 and the belt scale 11 formed on the intermediate transfer belt 113 so as to be continuous at equal intervals (predetermined intervals) in the moving direction using a belt scale sensor (mark detecting device) 10, to calculate the speed and by applying a calculated drive voltage instruction value for the drive motor 12 to the drive motor 12. The belt scale sensor is also described below as "mark detecting device". The belt scale sensor corresponds to a "mark detecting device" according to the appended claims.

In other words, the belt control device 30 includes a microcomputer (control CPU 49: See FIG. 9) that functions as a speed-position control unit, and performs speed control or position control of the intermediate transfer belt 113 using a control signal based on an output of the belt scale sensor 10 that detects a mark on the belt scale 11. This means that a speed or a position of an outer peripheral surface of the intermediate transfer belt 113 is controlled to an optimal value via the gears 13 and 14 and the drive roller 15 by calculating a speed (moving speed) of the outer peripheral surface (surface) of the intermediate transfer belt 113 from pulse intervals (binary signal, explained later) obtained by detecting the mark on the belt scale 11 using the belt scale sensor 10, feeding back the result of calculation to the control, outputting a corresponding control signal to the drive motor 12, and controlling the drive of the drive motor 12.

The drive motor 12, the gears 13 and 14, and the drive roller 15 correspond to a drive unit (drive force transmitting unit) that transmits the drive force for rotating (endlessly moving) the intermediate transfer belt 113 to the intermediate transfer belt 113. The belt scale sensor 10 is an optical sensor, which may be the whole of the mark detecting device 10 or may be part thereof (e.g., a combination of the light-receiving element and the light-emitting element), however, in the present embodiment, it is the whole of the mark detecting device 10. Because the belt scale sensor 10 only has to be connected to the belt control device 30, the belt scale sensor 10 may be configured as a part of the belt control device 30 or may be configured separately from the belt control device 30.

Figure 3:
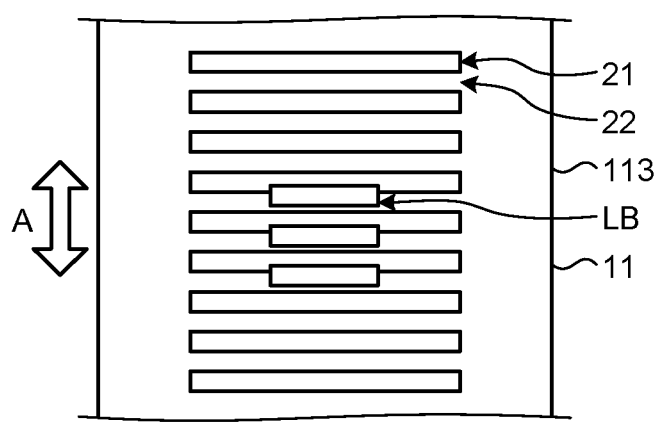
FIG. 3 is a diagram illustrating a front view of a portion of a belt scale when viewed from the above.
Figure 4:
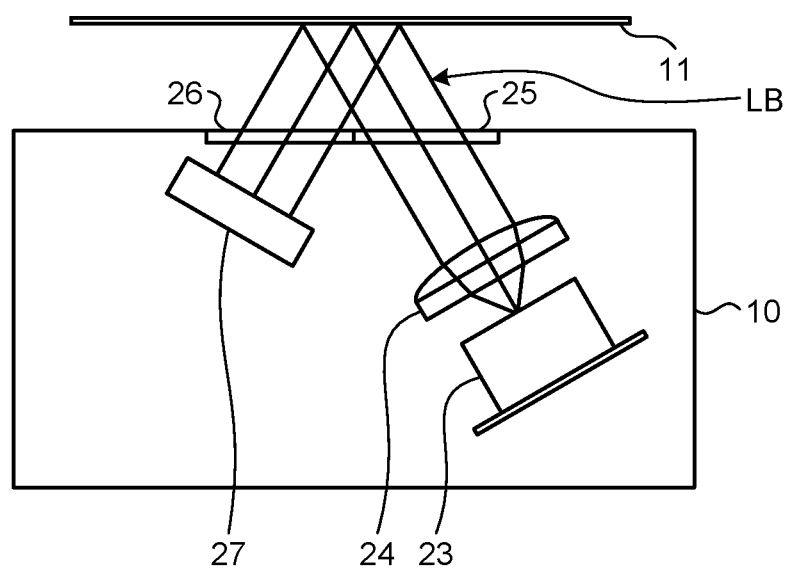
FIG. 4 is a diagram illustrating a configuration and an optical path of an optical system of a belt scale sensor.
Figure 5:
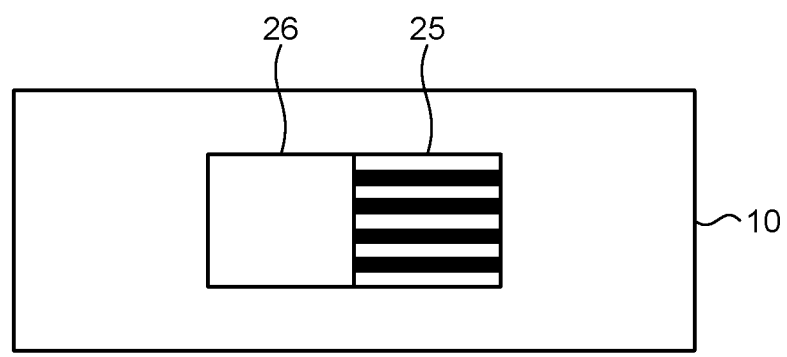
FIG. 5 is a diagram illustrating a front view of the belt scale sensor when viewed from the above.

Examples of the belt scale 11 and the belt scale sensor 10 will be explained next with reference to FIG. 3 to FIG. 5. FIG. 3 is a diagram illustrating a front view of a portion of the belt scale when viewed from the above. FIG. 4 is a diagram illustrating a configuration and an optical path of an optical system of the belt scale sensor. FIG. 5 is a diagram illustrating a front view of the belt scale sensor when viewed from the above.

As illustrated in FIG. 3, the belt scale 11 is a reflective scale that alternately forms a reflective portion (mark) 21 represented as a rectangle and a light-shielding portion 22 on the inner peripheral surface (which may be the outer peripheral surface) of the intermediate transfer belt 113 along its rotation direction A (that forms so that the reflective portion 21 is made continuous at equal intervals). For example, highly reflective aluminum is used for the reflective portion 21.

As illustrated in FIG. 4, the belt scale sensor 10 includes a light-emitting element (LED, etc.) 23, a collimate lens 24, a slit mask 25, a glass (which may be a transparent cover such as a transparent resin film) 26, a light-receiving element (phototransistor, etc.) 27, and the like. In the belt scale sensor 10, a beam (ray), which is emitted by the light-emitting element 23 and is made to parallel light by the collimate lens 24, passes through a slit mask (sensor slit member) 25 (see FIG. 5) having a plurality of slits in parallel with the belt scale 11 to be split into a plurality of beams LB (three beams in this example), the beams are incident on the belt scale 11 of the intermediate transfer belt 113, and part of the beams are reflected by the reflective portion 21. The beams LB which are the beams reflected by the reflective portion 21 of the belt scale 11 of the intermediate transfer belt 113 are received by the light-receiving element 27 via the glass 26 (see FIG. 5) of the belt scale sensor 10, and a light-dark change of the reflected light is converted into an electric signal.

Accordingly, the light-receiving element 27 of the belt scale sensor 10 can detect the reflective portion (mark) 21 of the belt scale 11 by receiving the reflected light and output an analog alternating signal (analog signal) continuously modulated based on the presence or absence of the reflective portion 21 due to the rotation of the intermediate transfer belt 113. That is, the light-receiving element 27 of the belt scale sensor 10 detects the reflective portion (mark) 21 of the belt scale 11 by receiving the reflected light, converts a movement amount of the intermediate transfer belt 113 into an electric signal in which a sine-wave alternating current signal is superimposed on a direct current component, and outputs the electric signal.

Figure 6:
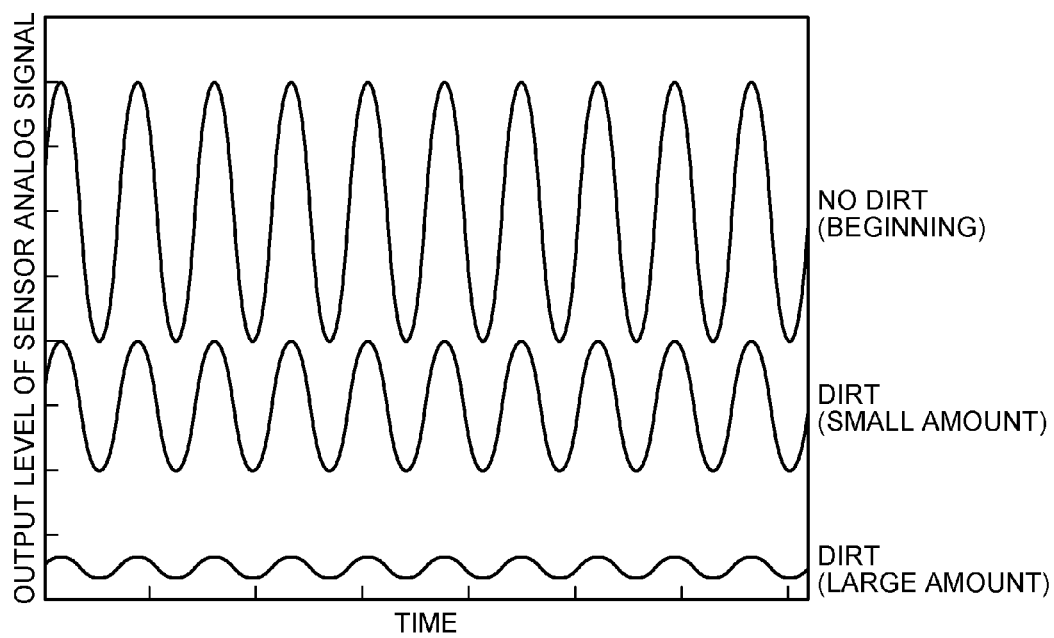
FIG. 6 is a diagram illustrating an example of waveforms of various analog alternating signals (sensor analog signals) output from the belt scale sensor.
Figure 7:
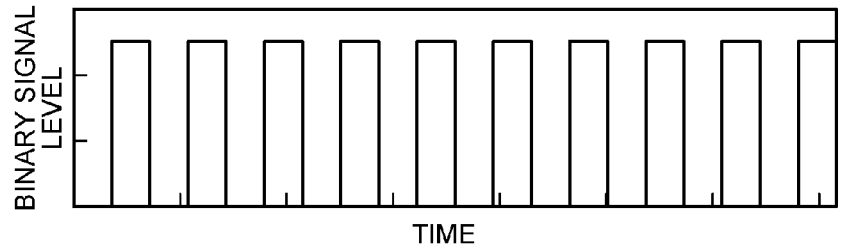
FIG. 7 is a diagram illustrating a waveform example of a binary signal obtained by binarizing the analog alternating signal.

Examples of various signals to be output when the belt scale sensor 10 detects the mark of the belt scale 11 will be explained next with reference to FIG. 6 and FIG. 7. FIG. 6 is a diagram illustrating an example of waveforms of various analog alternating signals (sensor analog signals) output from the belt scale sensor. FIG. 7 is a diagram illustrating a waveform example of a binary signal obtained by binarizing the analog alternating signal.

In the example of FIG. 6, a vertical axis represents an output level of a sensor analog signal (analog alternating signal), and a horizontal axis represents time. A top waveform represents a case where there is no dirt in a mark detection area of the belt scale 11 (beginning), a second waveform from the top represents a case where there is a small amount of dirt in the mark detection area of the belt scale 11 (small amount), and a bottom waveform represents a case where there is a large amount of dirt in the mark detection area of the belt scale 11 (large amount). In the example of FIG. 7, a vertical axis represents a binary signal level after each of the sensor analog signal outputs (analog alternating signals) is converted into a binary signal used for control, and a horizontal axis represents time.

The analog alternating signal (sensor analog signal) herein corresponds to an electric signal in which the sine-wave alternating current signal is superimposed on the direct current component. The direct current component slightly fluctuates depending on unevenness of reflectance or of transmittance or fluctuations of a detected distance. As illustrated in FIG. 6, the analog alternating signal output from the light-receiving element 27 of the belt scale sensor 10 becomes a different waveform depending on the presence or absence of deposition of dust (dirt on a mark detector) on the mark detection area and the amount of the dust (dirt). For example, when any dust is deposited on the mark detection area of the belt scale sensor 10, the beam emitted from the light-emitting element 23 is blocked by the dust and the light amount that the light-receiving element 27 can receive is reduced, which results in lowering of the output level of the electric signal (analog alternating signal) to be converted. In the example of FIG. 6, the output level lowers in order of No dirt (Beginning), Dirt (Small amount), and Dirt (Large amount). When the output level of the analog alternating signal (sensor analog signal) is low as illustrated in the case of Dirt (Large amount) in FIG. 6, it may be difficult to convert the analog alternating signal into a binary signal (see FIG. 7) used for control.

Figure 8:
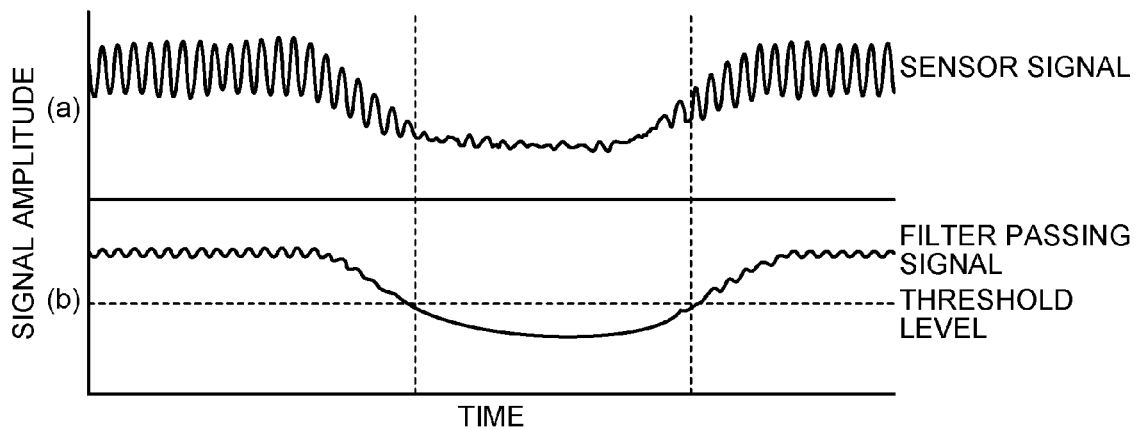
FIG. 8 is a diagram illustrating examples of a sensor signal output from the belt scale sensor and a filter passing signal.

A sensor signal (analog alternating signal) output from the belt scale sensor 10 and a filter passing signal after the sensor signal passes through a filter circuit will be explained next with reference to FIG. 8. FIG. 8 is a diagram illustrating examples of the sensor signal output from the belt scale sensor and the filter passing signal. In the example of FIG. 8, a vertical axis represents a signal amplitude, and a horizontal axis represents time. In addition, a waveform (a) in FIG. 8 represents an example of a waveform of the analog alternating signal output from the light-receiving element of the belt scale sensor, and a waveform (b) in FIG. 8 represents an example of a waveform of the filter passing signal after the analog alternating signal of the waveform (a) passes through the filter circuit.

The example of FIG. 8 represents the waveform of the sensor signal when the mark is undetectable by the belt scale sensor 10 (which corresponds to a mark undetectable portion) while the image forming apparatus (MFP) 100 is normally printing. The portion where the signal output decreases at the central portion where it is lower than a threshold level illustrated in the waveform (b) represents a state in which the beam emitted from the light-emitting element 23 is blocked due to, for example, deposition of dust on the mark detection area of the belt scale sensor 10 and the light amount that the light-receiving element 27 can receive is thereby reduced.

Figure 9:
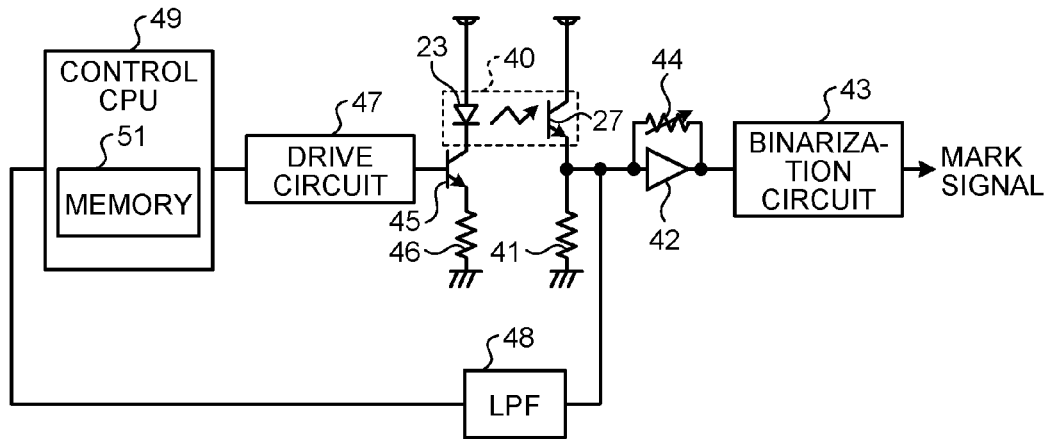
FIG. 9 is a diagram illustrating a configuration example of the belt scale sensor.

A configuration example of a control system of the belt scale sensor 10 will be explained next with reference to FIG. 9. FIG. 9 is a diagram illustrating a configuration example of the belt scale sensor.

In the belt scale sensor 10, a sensor unit 40 includes the light-emitting element 23, the collimate lens 24, the slit mask 25, the glass 26, and the light-receiving element 27. A collector terminal of the light-receiving element (NPN type phototransistor in this example) 27 that constitutes the sensor unit 40 is connected to a predetermined power supply and an emitter terminal thereof is grounded via a resister (RL) 41. An amplifier 42 and a binarization circuit 43 are serially connected to each other between a connection point between the emitter terminal of the light-receiving element 27 and the resistor 41 and an output terminal of a mark signal, and a thermistor 44 constituting a temperature compensation circuit is connected with the amplifier 42 in parallel with each other.

On the other hand, an anode terminal of the light-emitting element (LED in this example) 23 that constitutes the sensor unit 40 is connected to a predetermined power supply, and a cathode terminal thereof is connected to a collector terminal of an NPN type transistor 45. An emitter terminal of the transistor 45 is grounded via a resistor 46, and a base terminal thereof is connected to an output side of a drive circuit 47. Furthermore, a low pass filter (LPF) 48 is connected in between an input side of the drive circuit 47 and the connection point between the emitter terminal of the light-receiving element 27 and the resistor 41. The control CPU 49 is connected in between the drive circuit 47 and the LPF 48. That is, the control CPU 49 controls the drive circuit 47 and the LPF 48 to control the entire belt scale sensor 10. The control CPU 49 includes a memory 51.

In the belt scale sensor 10 configured in the above manner, the analog alternating signal (actually, a current flowed from the emitter terminal of the light-receiving element 27 is converted to voltage by the resistor 41 to become the analog alternating signal) output from the light-receiving element 27 illustrated in FIG. 6 is amplified by the amplifier 42 and is then output to the binarization circuit 43. At this time, the output of the amplifier 42 is stabilized by the thermistor 44. In other words, the thermistor 44 performs gain adjustment (temperature correction) of the amplifier 42 so that the output from the amplifier 42 to the binarization circuit 43 does not change due to the influence of the ambient temperature.

The binarization circuit 43 is a binarizing unit, which converts the analog alternating signal output from the amplifier 42 into the binary signal (digital signal) illustrated in FIG. 7, and outputs the converted signal as a mark signal to the belt control device 30 illustrated in FIG. 2.

The drive circuit 47 is a circuit that includes a constant current circuit or the like including an operational amplifier and is capable of varying a current flowing to the light-emitting element 23 according to an output voltage from the control CPU 49. That is, the drive circuit 47 adjusts light amount of the light-emitting element 23 by changing the amount of current to the base terminal of the transistor 45 based on the output of the control CPU 49.

The LPF 48 averages (smooths) the analog alternating signal (1 KHz to 2 KHz) output from the light-receiving element 27 as illustrated in (a) of FIG. 8, during printing, as illustrated in (b) of FIG. 8, and outputs the averaged signal to the control CPU 49. That is, of analog alternating signals output from the light-receiving element 27, the LPF 48 passes only a signal of a frequency band which is not more than a predetermined cutoff frequency, and outputs the signal as the filter passing signal to the control CPU 49.

The control CPU 49 is installed in the belt control device 30, functions as the light amount adjuster (light-amount adjusting unit) and a storage controller, and performs light amount adjustment of the light-emitting element 23 by changing the amount of current to the base terminal of the transistor 45 based on the output of the LPF 48. The control CPU 49 includes the memory (storage unit) 51 or includes the memory as a peripheral element of the control CPU 49, and the memory 51 holds an analog signal output from the LPF 48, an output voltage for setting of the drive current of the light-emitting element 23, and the like.

Figure 10:
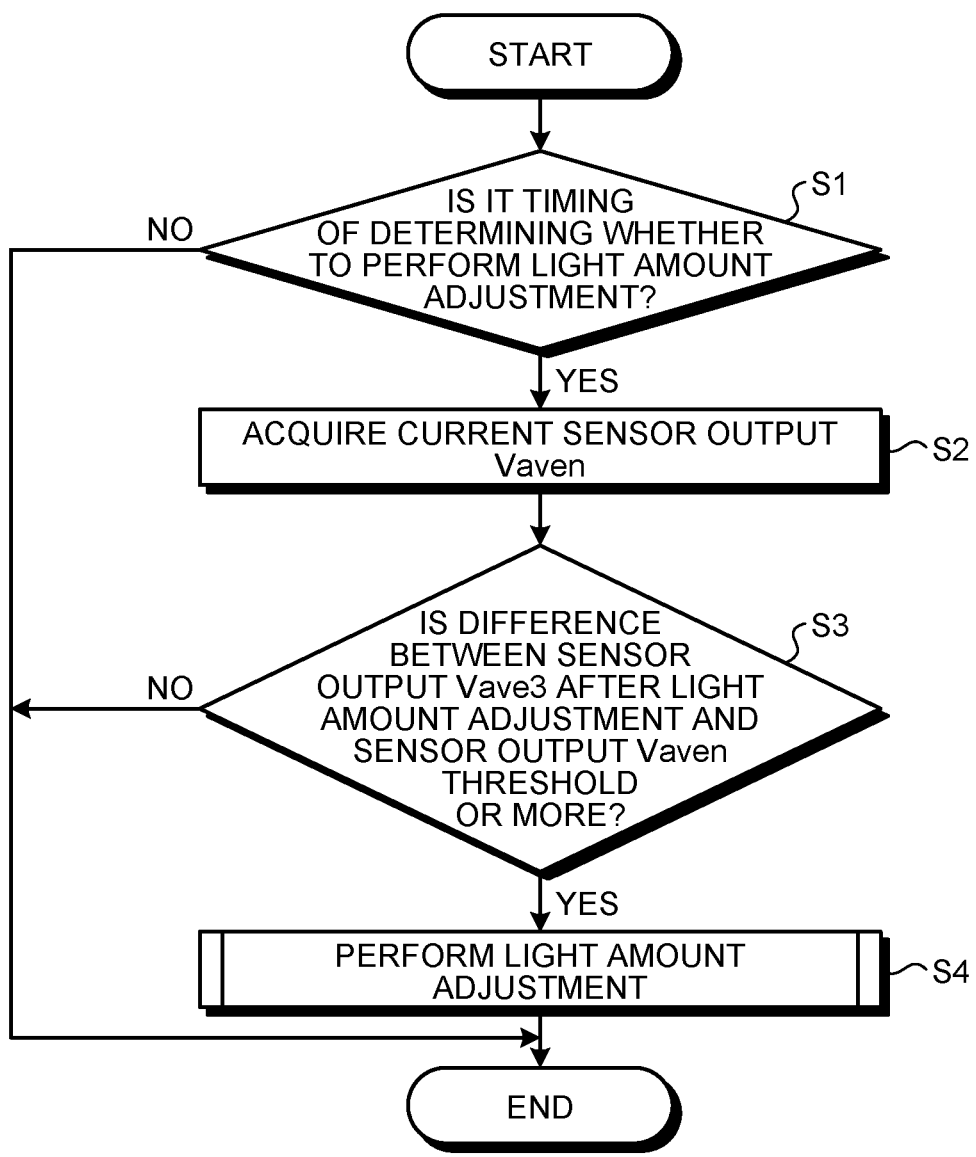
FIG. 10 is a diagram for explaining processing of light amount adjustment according to the first embodiment.

The processing of light amount adjustment of the belt scale sensor (mark detecting device) 10 will be explained next. FIG. 10 is a diagram for explaining the processing of light amount adjustment according to the present embodiment. The belt scale sensor (mark detecting device) 10 according to the present embodiment includes the light amount adjuster which is a function implemented by the control CPU 49 executing the program, and the storage controller, as illustrated in FIG. 9. Some of the units may be software (program) such that the control CPU 49 reads the software (program) from a read-only memory (ROM) or from the memory 51 and executes the program and the units are thereby loaded into a random access memory (RAM) to generate the units on the RAM. Part or all of the units may be replaced with a hardware circuit such as a processor that performs arithmetic processing.

First of all, the belt scale sensor 10 determines whether it is a predetermined timing of determining whether to perform light amount adjustment (Step S1). The timing of determining whether to perform light amount adjustment is arbitrary. When it is not the timing of determining whether to perform light amount adjustment (No at Step S1), the processing is ended. When it is the timing of determining whether to perform light amount adjustment (Yes at Step S1), the belt scale sensor 10 acquires a current sensor output Vaven (second value) (Step S2). The value Vaven is a value obtained by acquiring outputs of the light-receiving element 27 illustrated in FIG. 9 that are smoothed by the LPF 48, for one rotation of the intermediate transfer belt 113, and by averaging the outputs.

Subsequently, the belt scale sensor 10 determines whether a difference between a previous sensor output Vave3 (first value) after the light amount adjustment and the current sensor output Vaven (second value) obtained this time is a predetermined threshold (first threshold) or more (Step S3). In other words, the belt scale sensor 10 compares the sensor output Vave3 (first value) obtained from the signal output by the light-receiving element 27 having received the reflected light reflected from at least one of the belt and the mark (belt scale 11) with the sensor output Vaven (second value) obtained from the signal output by the light-receiving element 27 after the first value is obtained, and determines whether the difference between the first value and the second value is the first threshold or more. When the difference between the previous sensor output Vave3 and the current sensor output Vaven is not more than the predetermined threshold (first threshold) (No at Step S3), the processing is ended.

When the difference between the previous sensor output Vave3 and the current sensor output Vaven is the predetermined threshold (first threshold) or more (Yes at Step S3), the belt scale sensor 10 performs the light amount adjustment for adjusting the light amount of the light-emitting element 23 (Step S4), and ends the processing. In other words, the light amount adjuster compares the current sensor output Vaven (second value) with the previous sensor output Vave3 (first value) after the light amount adjustment previously stored in the memory (storage unit) 51, and performs, when the sensor output drops more than the predetermined threshold (first threshold) (when the light amount of the light-emitting element 23 decreases), the light amount adjustment for adjusting the light amount of the light-emitting element 23.

As an example of a setting method of the predetermined threshold (first threshold), there is, for example, a method of deriving an amount of decrease in the sensor output to an extent that does not affect the binarized mark signal through previous evaluation or the like and setting the threshold, as explained with reference to FIG. 9, however, the method is not limited thereto and it is therefore arbitrary. The extent that does not affect the binarized mark signal indicates that the precision, the same as that required when the sensor output Vave3 as a target is output, can be maintained even if the sensor output Vaven is decreased.

Figure 11:
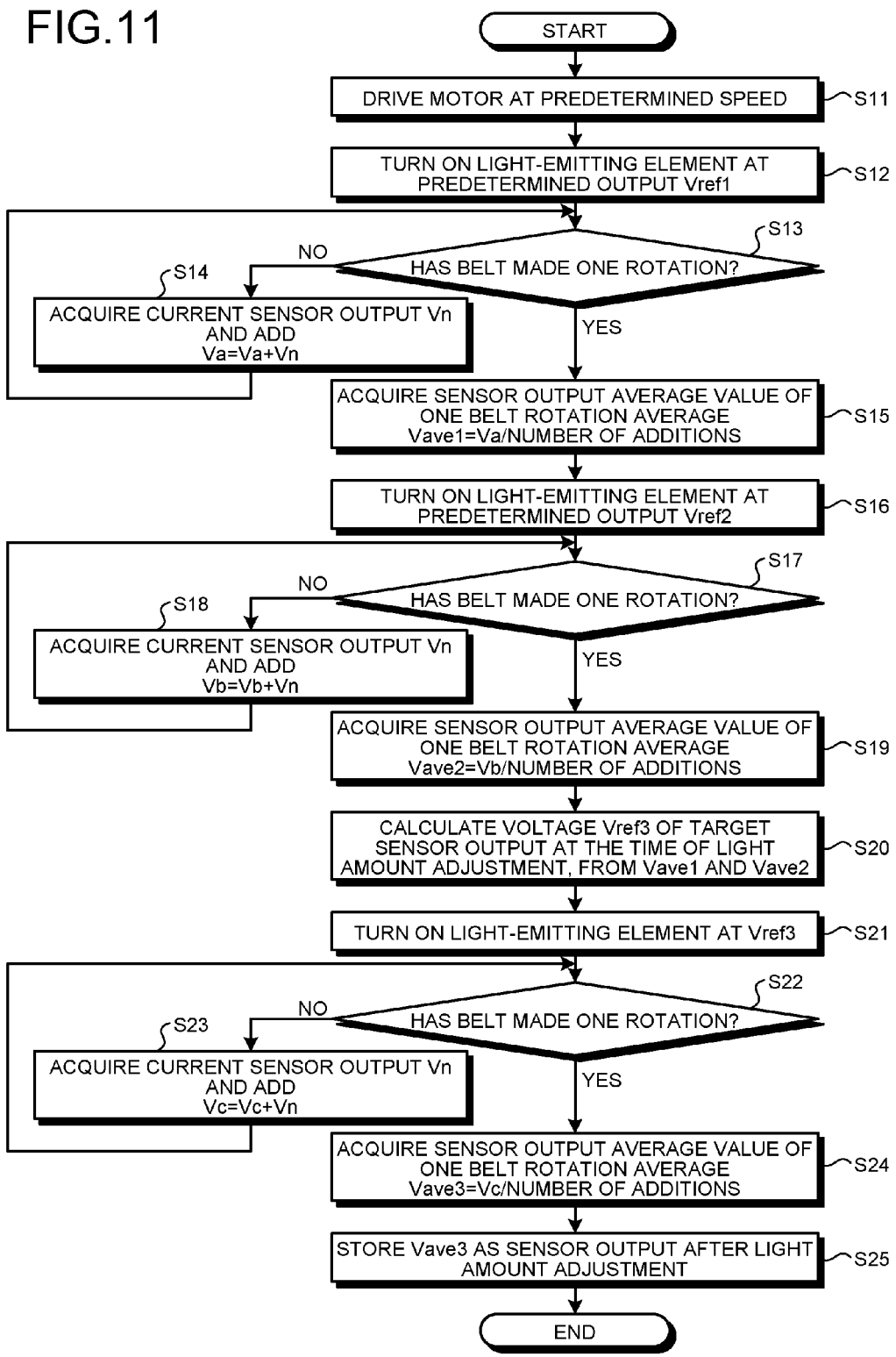
FIG. 11 is a diagram for explaining details of the processing of light amount adjustment.

Details of the processing of light amount adjustment performed at the Step S4 will be explained next. FIG. 11 is a diagram for explaining the details of the processing of light amount adjustment.

First of all, by issuing a drive instruction from the belt control device 30, the drive motor 12 is driven at a predetermined speed to operate the intermediate transfer belt 113 (Step S11). Then, the light-emitting element 23 is turned on at a given output Vref1 (Step S12). Here, Vref1 is a voltage applied from the control CPU 49 to the drive circuit 47, the current according to the Vref1 flows to the light-emitting element 23, and the light-emitting element 23 is thereby turned on.

Subsequently, the intermediate transfer belt 113 makes one rotation in a state in which the light-emitting element 23 is on by outputting Vref1. Then, the belt scale sensor 10 determines whether the intermediate transfer belt 113 has made one rotation (Step S13). When the intermediate transfer belt 113 has not made one rotation (No at Step S13), the belt scale sensor 10 acquires a current sensor output (output obtained by smoothing the output of the light-receiving element 27 of FIG. 9 in the LPF 48) Vn for one belt rotation of the intermediate transfer belt 113 at an arbitrary sampling period while rotating the intermediate transfer belt 113 one round and adds the outputs (Step S14). In other words, a sensor output Va for one belt rotation is obtained by acquiring a current sensor output Vn and sequentially adding outputs (Va=Va+Vn). When the intermediate transfer belt 113 has made one rotation (Yes at Step S13), the belt scale sensor 10 acquires a sensor output average value Vave1 of a one belt rotation average by dividing the sensor output Va for one belt rotation by the number of samplings (Step S15). In other words, the sensor output average value Vave1 is obtained by the equation of Vave1=Va/Number of additions (Number of samplings). The value Vave1 is a one belt rotation average of a waveform of the filter passing signal (b) illustrated in FIG. 8.

Subsequently, the light-emitting element 23 is turned on at a given output Vref2 (Step S16). The intermediate transfer belt 113 makes one rotation in a state in which the light-emitting element 23 is on by outputting Vref2. Then, the belt scale sensor 10 determines whether the intermediate transfer belt 113 has made one rotation (Step S17). When the intermediate transfer belt 113 has not made one rotation (No at Step S17), the belt scale sensor 10 acquires a current sensor output (output obtained by smoothing the output of the light-receiving element 27 of FIG. 9 in the LPF 48) Vn for the one belt rotation of the intermediate transfer belt 113 at an arbitrary sampling period while rotating the intermediate transfer belt 113 one round and adds the outputs (Step S18). In other words, a sensor output Vb for one belt rotation is obtained by acquiring a current sensor output Vn and sequentially adding outputs (Vb=Vb+Vn). When the intermediate transfer belt 113 has made one rotation (Yes at Step S17), the belt scale sensor 10 acquires a sensor output average value Vave2 of the one belt rotation average by dividing the sensor output Vb for one belt rotation by the number of samplings (Step S19). In other words, the sensor output average value Vave2 is obtained by the equation of Vave2=Vb/Number of additions (Number of samplings).

The belt scale sensor 10 then calculates a drive voltage Vref3 of the light-emitting element 23 from Vave1 and Vave2 to obtain a target sensor output Vptr3 (target output) at the time of light amount adjustment (Step S20). In the belt scale sensor (mark detecting device) 10 according to the present embodiment, a relationship between the current flowing to the light-emitting element 23 at a predetermined drive voltage and the sensor output is a proportional relationship, and in this case, the drive voltage Vref3 of the light-emitting element 23 can be calculated by the following Equation (1).

$$Vref3 = \{(Vptr3 - Vref2)/(Vref2 - Vref1)\} \times (Vave2 - Vave1) + Vave2 \quad (1)$$

The light-emitting element 23 is again turned on at the drive voltage Vref3 of the light-emitting element 23 calculated by using the Equation (1) (Step S21). The intermediate transfer belt 113 makes one rotation in a state in which the light-emitting element 23 is on by outputting Vref2. Then, the belt scale sensor 10 determines whether the intermediate transfer belt 113 has made one rotation (Step S22). When the intermediate transfer belt 113 has not made one rotation (No at Step S22), the belt scale sensor 10 acquires a current sensor output (output obtained by smoothing the output of the light-receiving element 27 of FIG. 9 in the LPF 48) Vn for the one belt rotation of the intermediate transfer belt 113 at an arbitrary sampling period while rotating the intermediate transfer belt 113 one round and adds outputs (Step S23). In other words, a sensor output Vc for one belt rotation is obtained by acquiring the current sensor output Vn and sequentially adding outputs (Vc=Vc+Vn). When the intermediate transfer belt 113 has made one rotation (Yes at Step S22), the belt scale sensor 10 acquires a sensor output average value Vave3 of the one belt rotation average by dividing the sensor output Vc for one belt rotation by the number of samplings (Step S24). In other words, the sensor output average value Vave3 is obtained by the equation of Vave3=Vc/Number of additions (Number of samplings).

Subsequently, the belt scale sensor 10 stores the sensor output average value Vave3 of the one belt rotation average as the sensor output (first value) after the light amount adjustment in the memory 51 (Step S25), and ends the processing. The sensor output average value Vave3 (first value) stored in the memory 51 is updated and stored after the light amount adjustment of the light-emitting element 23 is performed. In other words, the storage controller stores the value, as the first value (Vave3), obtained from the signal output by the light-receiving element 27 having received the reflected light reflected from at least one of the belt and the mark (belt scale 11) after the light amount adjuster performs the light amount adjustment of the light-emitting element 23, in the memory 51 (storage unit). In comparison between the first value and a next sensor output Vaven, the sensor output average value Vave3 (first value) stored in the memory 51 and the sensor output Vaven (second value) are compared with each other. As explained above, the first value (Vave3) and the second value (Vaven) are values obtained by averaging signals output by the light-receiving element 27 in a predetermined period of time (for one belt rotation).

Figure 12:
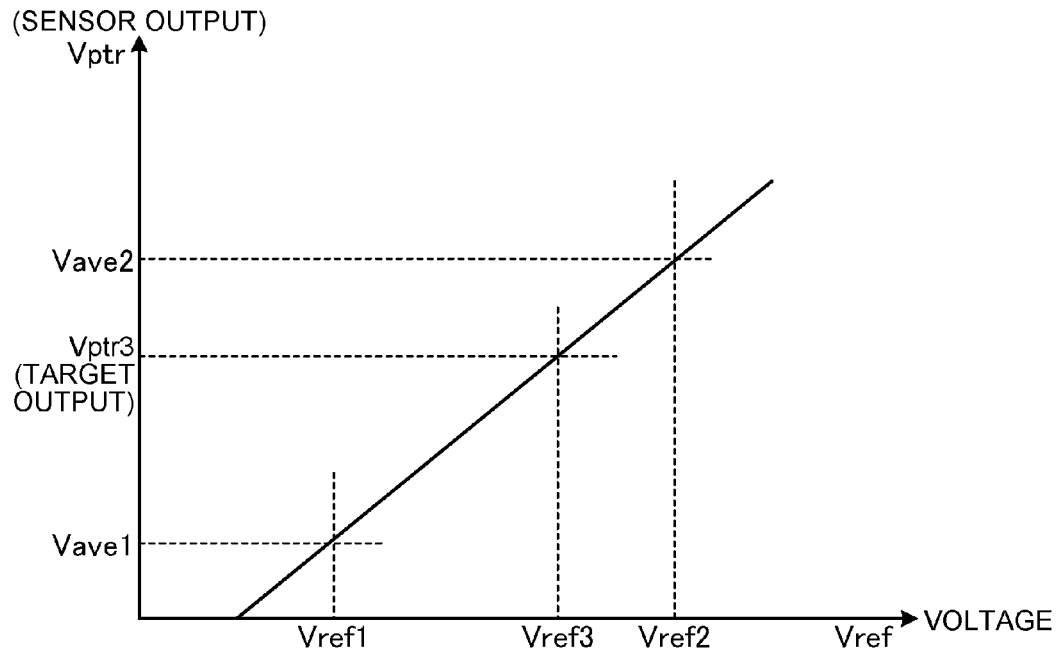
FIG. 12 is a diagram illustrating a relationship between a target sensor output of a light-receiving element and a drive voltage of a light-emitting element.

The relationship between the target sensor output Vptr3 of the light-receiving element 27 and the drive voltage Vref3 of the light-emitting element 23, which is explained using the Equation (1), will be explained next. FIG. 12 is a diagram illustrating a relationship between the target sensor output of the light-receiving element and the drive voltage of the light-emitting element. In the example of FIG. 12, a vertical axis represents a sensor output Vptr of the light-receiving element 27 and a horizontal axis represents a drive voltage Vref of the light-emitting element 23. As illustrated in FIG. 12, when the drive voltage Vref1 is output to the light-emitting element 23, the light-receiving element 27 outputs the sensor output Vave1. When the drive voltage Vref2 is output to the light-emitting element 23, the light-receiving element 27 outputs the sensor output Vave2. In this way, the sensor output Vptr of the light-receiving element 27 and the drive voltage Vref of the light-emitting element 23 have the proportional relationship. Therefore, when the target sensor output Vptr3 of the light-receiving element 27 is set, the drive voltage Vref3 of the light-emitting element 23 can be calculated from the proportional relationship in FIG. 12.

In this way, in the present embodiment, for the light amount adjustment of the belt scale sensor 10 that detects the belt scale (mark) 11, it is configured to perform the light amount adjustment only when the sensor output of the light-receiving element 27 drops more than the predetermined threshold as compared with the previous sensor output. Accordingly, it is possible to prevent that when the sensor output of the light-receiving element 27 drops more than the predetermined threshold as compared with the previous sensor output and if the sensor output cannot be increased above the set threshold even if the light amount adjustment is performed, the light amount adjustment is repeatedly performed at each timing of determining whether to perform the light amount adjustment thereafter as is the conventional technology. Moreover, because the light amount adjustment is not performed repeatedly, it is possible to prevent an increase in downtime of the image forming apparatus 100.

In the present embodiment, only when the sensor output of the light-receiving element 27 drops more than the predetermined threshold (first threshold) as compared with the previous sensor output, the light amount adjustment is performed without setting and using a fixed threshold unlike the conventional technology in order to determine whether the light amount adjustment is to be performed. Therefore, there is no need to repeatedly perform the light amount adjustment, and, further, there is a high degree of flexibility that allows the predetermined threshold (first threshold) to be arbitrarily set, thus approximating the sensor output of the light-receiving element 27 to the target value. Therefore, because there is no need to limit the predetermined threshold (first threshold) to any value around the threshold for abnormality determination and to set the value unlike the conventional technology, it is possible to prevent reduction in detection precision of a belt surface speed and to maintain high detection precision of the belt surface speed.

As explained above, according to the mark detecting device 10 of the present embodiment, only when the current sensor output drops more than the predetermined threshold as compared with the previous sensor output, the light amount adjustment is performed, and therefore it is possible to achieve beneficial effects that the repeated occurrence of the light amount adjustment can be prevented.

Second Embodiment

A second embodiment will be explained next. In the processing of light amount adjustment of the belt scale sensor (mark detecting device) 10 according to the first embodiment, when the difference between the previous sensor output Vave3 (first value) after the light amount adjustment and the current sensor output Vaven (second value) obtained this time is the predetermined threshold (first threshold) or more, the light amount adjustment for adjusting the light amount of the light-emitting element 23 is performed.

The second embodiment is different from the first embodiment in a point that the processing of determining whether the previous sensor output Vave3 (first value) after the light amount adjustment is less than the predetermined threshold (second threshold) is further added after it is determined that the difference between the previous sensor output Vave3 (first value) after the light amount adjustment and the current sensor output Vaven (second value) obtained this time is the predetermined threshold (first threshold) or more. When the sensor output Vave3 (first value) is less than the predetermined threshold (second threshold), the light amount adjustment of the light-emitting element 23 is performed, and when the sensor output Vave3 (first value) is the predetermined threshold (second threshold) or more, the light amount adjustment of the light-emitting element 23 is not performed. Hereinafter, explanation of the portions overlapping with these of the first embodiment is omitted accordingly.

Figure 13:
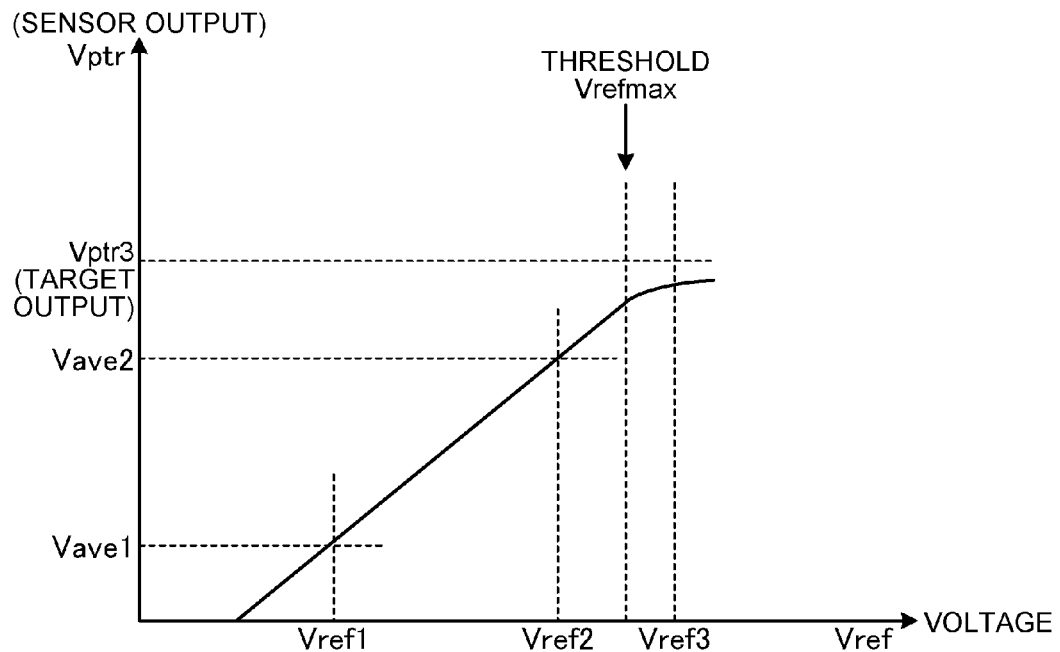
FIG. 13 is a diagram illustrating a relationship between a target sensor output of the light-receiving element and a drive voltage of the light-emitting element.

FIG. 13 is a diagram illustrating a relationship between a target sensor output of the light-receiving element and a drive voltage of the light-emitting element. In the example of FIG. 13, a vertical axis represents the sensor output Vptr of the light-receiving element 27 and a horizontal axis represents the drive voltage Vref of the light-emitting element 23. As illustrated in FIG. 13, when the drive voltage Vref1 is output to the light-emitting element 23, the light-receiving element 27 outputs the sensor output Vave1. When the drive voltage Vref2 is output to the light-emitting element 23, the light-receiving element 27 outputs the sensor output Vave2. As is explained with reference to FIG. 12, the sensor output Vptr of the light-receiving element 27 and the drive voltage Vref of the light-emitting element 23 have the proportional relationship, however, there is an upper limit threshold Vrefmax in the drive voltage Vref of the light-emitting element 23. As illustrated in FIG. 13, the proportional relationship has characteristic features such that when the drive voltage Vref is gradually increasing to the drive voltage Vrefmax or more, the proportional relationship does not hold. Therefore, when the drive voltage Vref3 corresponding to the previous sensor output Vave3 (first value) after the light amount adjustment is the Vrefmax or more, the sensor output cannot be increased even if the light amount adjustment of the light-emitting element 23 is performed, which results in an increase in unnecessary downtime. Therefore, the light amount adjustment of the light-emitting element 23 is prevented from being performed.

Figure 14:
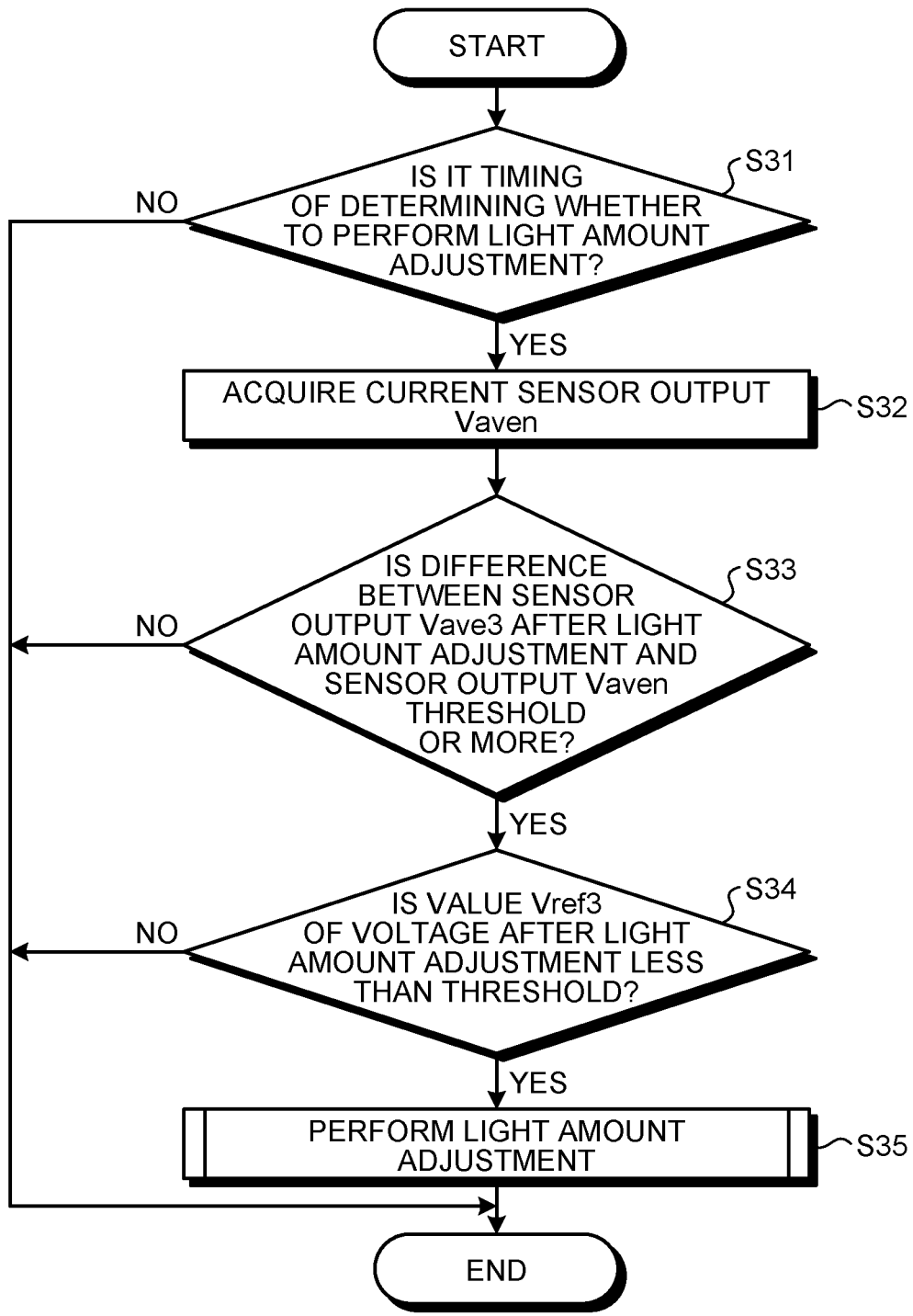
FIG. 14 is a diagram for explaining processing of light amount adjustment according to a second embodiment of the present invention.

FIG. 14 is a diagram for explaining the processing of light amount adjustment according to the present embodiment. First of all, the belt scale sensor 10 determines whether it is the predetermined timing of determining whether to perform light amount adjustment (Step S31). The timing of determining whether to perform light amount adjustment is arbitrary. When it is not the timing of determining whether to perform light amount adjustment (No at Step S31), the processing is ended. When it is the timing of determining whether to perform light amount adjustment (Yes at Step S31), the belt scale sensor 10 acquires a current sensor output Vaven (Step S32). The value Vaven is a value obtained by acquiring outputs of the light-receiving element 27 illustrated in FIG. 9 that are smoothed by the LPF 48, for one rotation of the intermediate transfer belt 113, and by averaging the outputs.

Subsequently, the belt scale sensor 10 determines whether a difference between the previous sensor output Vave3 (first value) after the light amount adjustment and the current sensor output Vaven (second value) obtained this time is the predetermined threshold (first threshold) or more (Step S33). When the difference between the previous sensor output Vave3 (first value) and the current sensor output Vaven (second value) is not more than the predetermined threshold (first threshold) (No at Step S33), the processing is ended.

When the difference between the previous sensor output Vave3 and the current sensor output Vaven is the predetermined threshold (first threshold) or more (Yes at Step S33), the belt scale sensor 10 determines whether the previous value Vref3 of the drive voltage of the light-emitting element 23 after the light amount adjustment is less than the predetermined threshold (second threshold) (Step S34). When the previous value Vref3 of the drive voltage of the light-emitting element 23 after the light amount adjustment is not less than the predetermined threshold (second threshold) (No at Step S34), the processing is ended. When the previous value Vref3 of the drive voltage of the light-emitting element 23 after the light amount adjustment is less than the predetermined threshold (second threshold) (Yes at Step S34), the belt scale sensor 10 performs the light amount adjustment for adjusting the light amount of the light-emitting element 23 (Step S35), and ends the processing.

In other words, the belt scale sensor 10 compares the current sensor output Vaven (second value) with the previously stored previous sensor output Vave3 (first value) after the light amount adjustment. When the sensor output drops more than the predetermined threshold (first threshold) (when the light amount of the light-emitting element 23 is decreased) and if the drive voltage Vref3 at which the light-emitting element 23 is emitted is less than the drive voltage Vrefmax which is the upper limit threshold, the belt scale sensor 10 performs the light amount adjustment for adjusting the light amount of the light-emitting element 23, and does not perform the light amount adjustment for adjusting the light amount of the light-emitting element 23 when the drive voltage Vref3 at which the light-emitting element 23 is emitted is the drive voltage Vrefmax being the upper limit threshold or more. The predetermined threshold (second threshold) Vrefmax can be arbitrarily set.

As explained above, according to the mark detecting device 10 of the present embodiment, only when the current sensor output drops more than the predetermined threshold as compared with the previous sensor output and the drive voltage Vref3 at which the light-emitting element 23 is emitted is less than the drive voltage Vrefmax which is the upper limit threshold, the light amount adjustment is performed, and therefore it is possible to achieve beneficial effects that the repeated occurrence of the light amount adjustment can be prevented.

Third Embodiment

A third embodiment will be explained next. In the first embodiment and the second embodiment, when the difference between the previous sensor output Vave3 (first value) after the light amount adjustment and the current sensor output Vaven (second value) obtained this time is the predetermined threshold (first threshold) or more, the light amount adjustment for adjusting the light amount of the light-emitting element 23 is performed. In other words, when the current sensor output Vaven (second value) drops more than the predetermined threshold (first threshold) from the previous sensor output Vave3 (first value) after the light amount adjustment, the light amount adjustment for adjusting the light amount of the light-emitting element 23 is performed.

The third embodiment is different from the embodiments, in order to respond to even a case where the current sensor output Vaven (second value) increases more than the previous sensor output Vave3 (first value) after the light amount adjustment, in a point that the processing of determining whether the sensor output of the light-receiving element 27 is less than a maximum output (fixed threshold) Vptrmax (less than a maximum value) and the processing of determining whether the drive voltage at which the light-emitting element 23 is emitted is less than the upper-limit drive voltage Vrefmax (less than the upper limit) are further added. When the sensor output of the light-receiving element 27 is the maximum output (fixed threshold) Vptrmax or more, the light amount adjustment is performed so as to decrease the light amount of the light-emitting element 23 so that the sensor output becomes less than the maximum output Vptrmax (less than the maximum value). When the sensor output of the light-receiving element 27 is less than the maximum output (fixed threshold) Vptrmax (less than the maximum value), and the current sensor output Vaven (second value) drops more than the predetermined threshold (first threshold) from the previous sensor output Vave3 (first value) after the light amount adjustment, and when the drive voltage at which the light-emitting element 23 is emitted is less than the upper-limit drive voltage Vrefmax (less than the second threshold), the light amount adjustment is performed so as to increase the light amount of the light-emitting element 23. Hereinafter, explanation of the portions overlapping with these of the first embodiment and the second embodiment is omitted accordingly.

Figure 15:
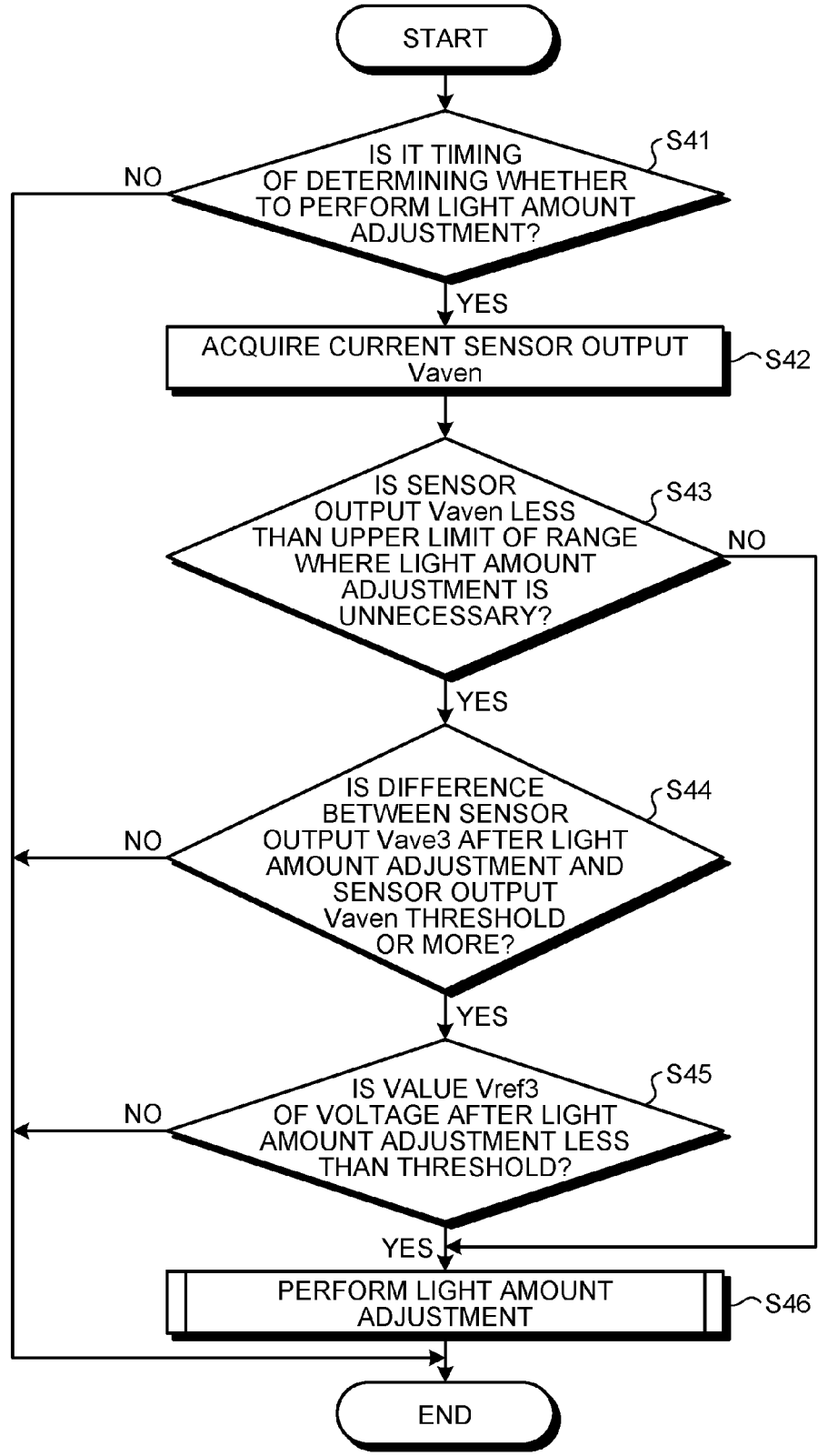
FIG. 15 is a diagram for explaining processing of light amount adjustment according to a third embodiment of the present invention.

FIG. 15 is a diagram for explaining the processing of light amount adjustment according to a third embodiment. First of all, the belt scale sensor 10 determines whether it is the predetermined timing of determining whether to perform light amount adjustment (Step S41). The timing of determining whether to perform light amount adjustment is arbitrary. When it is not the timing of determining whether to perform light amount adjustment (No at Step S41), the processing is ended. When it is the timing of determining whether to perform light amount adjustment (Yes at Step S41), the belt scale sensor 10 acquires a current sensor output Vaven (Step S42). The value Vaven is a value obtained by acquiring outputs of the light-receiving element 27 illustrated in FIG. 9 that are smoothed by the LPF 48, for one rotation of the intermediate transfer belt 113, and by averaging the outputs.

Subsequently, the belt scale sensor 10 determines whether the sensor output Vaven of the light-receiving element 27 is less than the upper limit of a range where the light amount adjustment is unnecessary (Step S43). In other words, the belt scale sensor 10 determines whether the sensor output Vaven of the light-receiving element 27 is less than the maximum output (fixed threshold) of the sensor output Vptrmax. When the sensor output Vaven of the light-receiving element 27 is not less than the upper limit of the range where the light amount adjustment is unnecessary (No at Step S43), the processing proceeds to Step S46, and the belt scale sensor 10 performs the light amount adjustment so as to decrease the light amount of the light-emitting element 23 (Step S46) and ends the processing. In other words, when the sensor output of the light-receiving element 27 is the maximum value (upper limit) or more, the belt scale sensor 10 performs the light amount adjustment so as to decrease the light amount of the light-emitting element 23. The reason that the determination processing at Step S43 is performed is because the mark of the belt scale 11 cannot be detected while detecting an increase in the current sensor output Vaven (second value) (light amount increases) from the previous sensor output Vave3 (first value) after the light amount adjustment. In short, it is because a sensor analog signal (analog alternating signal) to be output when the mark of the belt scale 11 is detected cannot be correctly detected.

When the sensor output Vaven of the light-receiving element 27 is less than the upper limit of the range where the light amount adjustment is unnecessary (Yes at Step S43), i.e., when the sensor output Vaven of the light-receiving element 27 is less than the maximum output (fixed threshold) Vptrmax (less than the maximum value) of the sensor output, the belt scale sensor 10 determines whether a difference between the previous sensor output Vave3 (first value) after the light amount adjustment and the current sensor output Vaven (second value) obtained this time is the predetermined threshold (first threshold) or more (Step S44). When the difference between the previous sensor output Vave3 and the current sensor output Vaven is not more than the predetermined threshold (first threshold) (No at Step S44), the processing is ended.

When the difference between the previous sensor output Vave3 and the current sensor output Vaven is the predetermined threshold or more (Yes at Step S44), the belt scale sensor 10 determines whether the previous value Vref3 of the drive voltage of the light-emitting element 23 after the light amount adjustment is less than the predetermined threshold (second threshold) (Step S45). In other words, the belt scale sensor 10 determines whether the drive voltage at which the light-emitting element 23 is emitted is less than the upper-limit drive voltage Vrefmax. When the previous value Vref3 of the drive voltage of the light-emitting element 23 after the light amount adjustment is not less than the predetermined threshold (second threshold) (the drive voltage at which the light-emitting element 23 is emitted is not less than the upper-limit drive voltage Vrefmax) (No at Step S45), the processing is ended. When the previous value Vref3 of the drive voltage of the light-emitting element 23 after the light amount adjustment is less than the predetermined threshold (second threshold) (the drive voltage at which the light-emitting element 23 is emitted is less than the upper-limit drive voltage Vrefmax) (Yes at Step S45), the belt scale sensor 10 performs the light amount adjustment so as to increase the light amount of the light-emitting element 23 (Step S46), and ends the processing.

As explained above, according to the mark detecting device 10 of the present embodiment, it is possible to achieve beneficial effects that the light amount adjustment can be performed even if the current sensor output increases more than the previous sensor output.

Programs to be executed by the mark detecting device 10 according to the embodiments may be configured to be provided by being recorded in a computer-readable recording medium such as Floppy (registered trademark) disk, a compact disk (CD), a compact disk recordable (CD-R), a compact disk read only memory (CD-ROM), a digital versatile disk (DVD), an SD memory card, and a Universal Serial Bus (USB) memory in an installable or executable file format, or may be configured to be provided or distributed via a network such as the Internet. Moreover, various programs may be configured to be provided by being preinstalled in a ROM or the like.

According to exemplary embodiments of the present invention, it is possible to prevent the repeated occurrence of the light amount adjustment.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A mark detecting device comprising:
a belt on which a plurality of marks are provided along a moving direction of the belt;
a light-emitting element configured to irradiate at least one of the marks with light;
a light-receiving element configured to receive a reflected light reflected from at least one of the belt and the mark of the light irradiated from the light-emitting element and output a signal;
a memory configured to store therein a first value obtained from the signal output from the light-receiving element; and
circuitry configured to
perform light amount adjustment of the light-emitting element when a second value that is obtained from the signal output from the light-receiving element after the first value has been obtained is a first threshold or more, and
perform the light amount adjustment of the light-emitting element when, even if the second value is less than the first threshold, a difference between the first value and the second value is a second threshold or more and a value of a voltage that emits the light-emitting element and corresponds to the first value is less than a third threshold.

2. The mark detecting device according to claim 1, wherein the first value and the second value are values obtained by averaging signals output by the light-receiving element in a predetermined period of time.

3. The mark detecting device according to claim 1, wherein
a value of the signal output by the light-receiving element and a value of a voltage to emit the light-emitting element have a proportional relationship.

4. The mark detecting device according to claim 1, wherein
the belt is an endless belt, and
the marks are provided so as to be continuous at equal intervals along the moving direction of the endless belt.

5. A belt control device comprising:
the mark detecting device according to claim 1;
a drive unit configured to transmit a drive force to move the belt; and
a control unit configured to control a speed at which the belt is moved or a position thereof by controlling the drive unit using a control signal based on the signal output from the light-receiving element of the mark detecting device.

6. An image forming apparatus comprising the belt control device according to claim 5.

7. A mark detecting method of a mark detecting device including a belt on which a plurality of marks are provided along a moving direction of the belt, a light-emitting element configured to irradiate at least one of the marks with light, and a light-receiving element configured to receive a reflected light reflected from at least one of the belt and the mark of the light irradiated from the light-emitting element and output a signal, the mark detecting method comprising:
storing a first value obtained from the signal output from the light-receiving element; and performing light amount adjustment of the light-emitting element when a second value that is obtained from the signal output from the light-receiving element after the first value has been obtained is a first threshold or more, and performing the light amount adjustment of the light-emitting element when, even if the second value is less than the first threshold, a difference between the first value and the second value is a second threshold or more and a value of a voltage that emits the light-emitting element and corresponds to the first value is less than a third threshold.

8. A non-transitory computer-readable recording medium that contains a computer program for causing a mark detecting device including a belt on which a plurality of marks are provided along a moving direction of the belt, a light-emitting element configured to irradiate at least one of the marks with light, and a light-receiving element configured to receive a reflected light reflected from at least one of the belt and the mark of the light irradiated from the light-emitting element and output a signal, to execute:

storing a first value obtained from the signal output from the light-receiving element; and performing light amount adjustment of the light-emitting element when a second value that is obtained from the signal output from the light-receiving element after the first value has been obtained is a first threshold or more, and performing the light amount adjustment of the light-emitting element when, even if the second value is less than the first threshold, a difference between the first value and the second value is a second threshold or more and a value of a voltage that emits the light-emitting element and corresponds to the first value is less than a third threshold.

\* \* \* \* \*